US012798225B2

(12) United States Patent
Paolino

(10) Patent No.: US 12,798,225 B2
(45) Date of Patent: Nov. 17, 2026

(54) APPARATUS AND METHOD FOR MANUFACTURING VERTICAL STRIPS INCLUDABLE IN A SHEER VERTICAL BLIND

(71) Applicant: Andrea Paolino, Brugherio (IT)

(72) Inventor: Andrea Paolino, Brugherio (IT)

( * ) Notice: Subject to any disclaimer, the term of this patent is extended or adjusted under 35 U.S.C. 154(b) by 109 days.

(21) Appl. No.: 19/102,750

(22) PCT Filed: Jan. 12, 2023

(86) PCT No.: PCT/IT2023/050006
§ 371 (c)(1),
(2) Date: Feb. 10, 2025

(87) PCT Pub. No.: WO2024/079764
PCT Pub. Date: Apr. 18, 2024

(65) Prior Publication Data

US 2026/0048577 A1 Feb. 19, 2026

(30) Foreign Application Priority Data

Oct. 12, 2022 (IT) ........................ 102022000021000

(51) Int. Cl.
*B32B 38/00* (2006.01)
*B32B 37/20* (2006.01)

(52) U.S. Cl.
CPC ........ *B32B 38/0004* (2013.01); *B32B 37/203* (2013.01)

(58) Field of Classification Search
CPC ............ B32B 38/0004; B32B 38/1816; B32B 37/203; B26D 1/141; B26D 9/00;
(Continued)

(56) References Cited

U.S. PATENT DOCUMENTS

| | | | | |
|---|---|---|---|---|
| 5,960,850 A | 10/1999 | Colson et al. | | |
| 2008/0066277 A1* | 3/2008 | Colson .................... | B29C 53/36 29/24.5 |
| 2008/0223505 A1* | 9/2008 | Bompard ............... | D04H 3/002 156/324 |

FOREIGN PATENT DOCUMENTS

WO 9635854 A1 11/1996

OTHER PUBLICATIONS

International Search Report and Written Opinion of the ISA for PCT/IT2023/050006, mailed Aug. 1, 2023, 14 pages.

* cited by examiner

*Primary Examiner* — John L Goff, II
(74) *Attorney, Agent, or Firm* — NIXON & VANDERHYE

(57) ABSTRACT

An apparatus for making vertical strips includable in a sheer vertical blind includes a support surface on which a first reel formed by a band made of flexible material and wound on itself, is unwound. The reel is gripped by a gripper at a transverse edge thereof and dragged over the support surface. A second reel made of non-woven fabric is unwound transversely over the first reel and cut to make a selvedge that is heat sealed to the first reel, after being rested on the stretch of first unwound reel. The selvedge is then cut longitudinally together with the underlying band. A strip is separated from the first reel. A pair of coupling members is rested and sealed by ultrasound on the portion of ribbon made of non-woven fabric sealed onto the strip. A method for making the vertical strips is implementable by the apparatus.

8 Claims, 10 Drawing Sheets

(58) Field of Classification Search
CPC ......... E06B 9/36; E06B 9/266; B29C 66/437; Y10T 156/1084; Y10T 156/125; Y10T 156/1217; Y10T 156/1343
USPC ........................... 156/269, 65, 511, 516, 522
See application file for complete search history.

APPARATUS AND METHOD FOR MANUFACTURING VERTICAL STRIPS INCLUDABLE IN A SHEER VERTICAL BLIND

CROSS-REFERENCE TO RELATED APPLICATIONS

This application is the U.S. national phase of International Application No. PCT/IT2023/050006 filed Jan. 12, 2023, which designated the U.S. and claims priority to IT 102022000021000 filed Oct. 12, 2022, the entire contents of each of which are hereby incorporated by reference.

FIELD OF APPLICATION OF THE INVENTION

The present invention applies to the field of interior furnishings. Namely, the present invention relates to orientable striped vertical blinds, that is, blinds comprising a plurality of strips made of fabric or other material hung, at an end thereof, to respective hooks rotatable around a vertical axis and slidable along a horizontal track generally fastened to the ceiling. A blind of the aforesaid type is "closed" when the hooks, and consequently the vertical strips, are distributed along the sliding track thereof. From "closed", said blind becomes "completely open" by sliding all the hooks to one end of the aforesaid track so that the vertical strips overlap one another, thus minimizing the overall dimensions of the blind.

The strips forming the blind in so-called "classical" striped vertical blinds generally are flat and rectangular, they are centrally hung on a respective hook at a short end of the rectangle like they are shaped, and are connected to one another at the short side of the aforesaid rectangle opposite to the side connected to the hook. An alternative to classical striped vertical blinds consists of striped vertical blinds commonly called sheer vertical blinds. The vertical strips forming this type of blind are rectangular but folded onto themselves longitudinally so that the cross section of the strip substantially is "U"-shaped. Each strip is hung on a pair of hooks respectively close to the ends of a short side of the rectangle like the strip is formed. It is the connection to a pair of hooks that keeps the strips folded longitudinally as described above. The vertical strips of sheer vertical blinds oppose one another at arms of the aforesaid "U" so that the concavities of the "U" all face the same side (generally towards the window, French window or shop window of which the blind forms a furnishing element). Moreover, the vertical strips of sheer vertical blinds are not mutually connected at the short side of the aforesaid rectangle opposite to the side connected to the pair of hooks. Classical striped vertical blinds, as well as sheer vertical blinds, are substantially known. Therefore, no further details will be provided.

The present invention in particular relates to an apparatus and a method for making vertical strips includable in a sheer vertical blind.

To avoid any misunderstanding, here and later in the present description, as well as in the claims, the aforesaid strips includable in a sheer vertical blind are described as "vertical" even if they are not arranged vertically when they are manufactured. In other words, the adjective "vertical" relates to the fact that the aforesaid strips are arranged vertically after being hung on the special hooks.

OVERVIEW OF THE PRIOR ART

The vertical strips of a sheer vertical blind generally are made substantially manually, that is almost without any automation. The Applicant is not aware of any apparatus for the automated manufacturing of vertical strips includable in a sheer vertical blind.

OBJECTS OF THE INVENTION

It is the object of the present invention to overcome the aforesaid drawbacks by presenting an apparatus capable of making a plurality of vertical strips includable in a sheer vertical blind in an at least partly automated manner.

It is another object of the present invention to present a method for making a plurality of vertical strips includable in a sheer vertical blind which is implementable by means of the apparatus the object of the invention.

SUMMARY AND ADVANTAGES OF THE INVENTION

The object of the present invention is an apparatus for making a plurality of vertical strips includable in a sheer vertical blind, said apparatus comprising:

- a support surface;
- first gripping means adapted to be reversibly connected to a band at least partly made of flexible material,
- said first gripping means being adapted to be reversibly connected to said band at a first transverse edge of the latter.
- The band is preferably wound on itself to form a roll, generally defined as a "reel". Incidentally, asserting that the gripping means are adapted to be reversibly connected to a band means that said means are connectable to said band and disconnectable therefrom an indefinite number of times;
- first movement means connected to said first gripping means and adapted to translate the latter over said support surface so that when said first gripping means are connected to said band, a translation of said first gripping means by said first movement means causes a dragging of said band (and preferably an unwinding of the aforesaid reel if said band is wound on itself to form a roll) on said support surface;
- second gripping means adapted to be reversibly connected to a ribbon at least partly made of non-woven fabric,
- said second gripping means being adapted to be reversibly connected to said ribbon at a preferably transverse edge of the latter;
- second movement means connected to said second gripping means and adapted to translate the latter over said support surface so that when said second gripping means are connected to said ribbon, a translation of said second gripping means by said second movement means causes a dragging of said ribbon on said support surface,
- said first and second movement means being adapted to sufficiently translate said first and second gripping means, respectively, over said support surface so that, and in respective directions such that, when said first and second gripping means are connected to said band and said ribbon, respectively:
  - said band is draggable, by said first movement means, on said support surface so that a portion of said band not including said first transverse edge is placeable at at least a stretch of the path travelable by said second gripping means at a translation thereof over said support surface by said second movement means and said ribbon is draggable, by said second movement means, and restable on said portion of said band so that said ribbon at least partly opposes said portion of said band transversely to said band, so that said ribbon is draggable on said support surface, by said second movement means, with the interposition of said portion of said band between said support surface and said ribbon;

first joining means adapted to mutually connect, preferably by so-called "textile" heat sealing, said ribbon and said portion of said band following a resting of said ribbon on said portion of said band by said second movement means;

separation means adapted to make a through cut longitudinally in said ribbon and simultaneously transversely in said band at said portion of the latter following a mutual connection between said ribbon and said portion of said band by said first joining means, so as to divide said ribbon into a first portion and a second portion, and said band, at said portion thereof, into:

a first stretch extending from:

said first transverse edge of said band toward a second transverse edge of said band, opposite to said first transverse edge and formed following said cut made by said separation means, an end section of said first stretch of said band extending from said second transverse edge being covered by said first portion of said ribbon and a second stretch corresponding to the remaining part of said band and extending from:

a third transverse edge of said band, opposing said second transverse edge and also formed following said cut made by said separation means toward a fourth transverse edge of said band, opposite to said third transverse edge (and opposite to a first transverse edge before said cut was made by said separation means), an end section of said second stretch of said band extending from said third transverse edge being covered by said second portion of said ribbon;

third gripping means adapted to be reversibly connected to a pair of coupling members, each of said coupling members comprising a base and a slot, said third gripping means being adapted to be reversibly connected to each of said coupling members at said base.

Incidentally, asserting that the gripping means are adapted to be reversibly connected to a coupling member means that said means are connectable to said coupling member and disconnectable from the latter an indefinite number of times;

third movement means connected to said third gripping means and adapted to move the latter in such a manner so that, following:

a division, by said separation means, of said ribbon into said first and second portions, a division, by said separation means, of said band into said first and second stretches and a connection of said third gripping means to said pair of coupling members, said pair of coupling members is restable on said first portion of said ribbon at said bases and with said slots projecting past said second transverse edge (of said first stretch) of said band, said third movement means being adapted to translate said third gripping means so that said coupling members are restable on said first portion of said ribbon on opposite sides with respect to a longitudinal axis of symmetry of said band;

second joining means adapted to mutually connect, preferably by means of ultrasonic sealing, each coupling member of said pair and (said first portion of) said ribbon following a resting of said pair of coupling members on said first portion of said ribbon by said third movement means, so that said first stretch of said band, following a disconnection of:

said first gripping means from said first stretch of said band, said second gripping means from said ribbon and said third gripping means from said pair of coupling members, may serve as vertical strip includable in a sheer vertical blind, said first movement means, following a disconnection of said first gripping means from said first stretch of said band, being adapted to translate said first gripping means into a position such that said first gripping means are reversibly connectable to said second stretch of said band at said third transverse edge, said second movement means, following a disconnection of said second gripping means from said ribbon, being adapted to translate said second gripping means into a position such that said second gripping means are reversibly connectable to a further ribbon at least partly made of non-woven fabric, at a preferably transverse edge of said further ribbon, said third movement means, following a disconnection of said third gripping means from said pair of coupling members, being adapted to move said third gripping means into a position such that said third gripping means are reversibly connectable to a further pair of said coupling members at said bases of the latter, so that:

following a connection of said first gripping means to said second stretch of said band, together with said second portion of said ribbon, said second stretch of said band is draggable, at said third transverse edge, on said support surface by said first movement means so that a further portion of said band belonging to said second stretch thereof and not including said third transverse edge is placeable at said stretch of the path travelled by said second gripping means at a translation thereof by said second movement means;

following a connection of said second gripping means to said further ribbon at said edge of the latter, said further ribbon is draggable, by said second movement means, and restable on said further portion of said second stretch of said band so that said further ribbon at least partly opposes said further portion of said second stretch of said band transversely to said band;

following a resting of said further ribbon on said further portion of said second stretch of said band, said further ribbon and said further portion of said second stretch of said band are mutually connectable by said first joining means;

following a mutual connection between said further ribbon and said further portion of said second stretch of said band by said first joining means, said further ribbon is dividable, by said separation means, into a first portion and a second portion, and said second stretch of said band, at said further portion thereof, into:

a first sub-stretch extending from:

said third transverse edge of said second stretch of said band toward a fifth transverse edge of said second stretch of said band, opposite to said third transverse edge, and formed following said cut made by said separation means in said second stretch of said band, an end section of said first sub-stretch of said second stretch of said band extending from said fifth transverse edge being covered by said first portion of said further ribbon and a second sub-stretch corresponding to the remaining part of said second stretch of said band and extending from:

a sixth transverse edge of said second stretch of said band, opposing said fifth transverse edge, and it also formed following said cut made by said separation means in said second stretch of said band toward said fourth transverse edge of said second stretch of said band, an end section of said second sub-stretch of said second stretch of said band extending from said sixth transverse edge being covered by said second portion of said further ribbon;

following:

a division, by said separation means, of said further ribbon into said first and second portions, a division, by said separation means, of said second stretch of said band into said first and second sub-stretches and a connection of said third gripping means to said further pair of coupling members said further pair of said coupling members is restable, by said third movement means, on said first portion of said further ribbon at said bases, with said slots projecting past said fifth edge of said first sub-stretch of said second stretch of said band, and with said coupling members of said further pair on opposite sides with respect to said longitudinal axis of symmetry of said band;

following a resting of said further pair of coupling members on said first portion of said further ribbon, said further pair of coupling members and said first portion of said further ribbon are mutually connectable, so that said first sub-stretch of said second stretch of said band, following a disconnection of:

said first gripping means from said first sub-stretch of said second stretch of said band, said second gripping means from said further ribbon and said third gripping means from said further pair of coupling members, may serve as further vertical strip includable in a sheer vertical blind.

The apparatus of the invention is adapted to make a plurality of vertical strips includable in a sheer vertical blind in at least partly automated manner.

The first gripping means connect to the above-mentioned band at the first transverse edge thereof and the first movement means drag the aforesaid band on the support surface so that a portion thereof not including the aforesaid first transverse edge is at the second gripping means. The latter connect to a ribbon made of non-woven fabric and the second movement means drag the ribbon on the band at the aforesaid portion. The first joining means seal the ribbon to the band and the separation means make a through cut in the ribbon and in the underlying aforesaid portion of band, dividing the ribbon into the above-mentioned first and second portions and the band into the above-mentioned first and second stretches. The third gripping means connect to a pair of coupling members and the third movement means rest the two coupling members on the first portion of ribbon. Then the second joining means seal the coupling members to the first portion of ribbon. The first coupling means subsequently disconnect from the aforesaid first stretch of the band (which has become a vertical strip includable in a sheer vertical blind) and the first movement means translate the first coupling means so that the latter connect to the second stretch of the band. The above-described process is repeated, dividing the second stretch of the band into a first and second sub-stretches. Said first sub-stretch becomes a further vertical strip includable in a sheer vertical blind. The above-described process is repeated, dividing the second sub-stretch of the second stretch of the band into two further sub-sub-stretches, etcetera.

Since the separation means cut the band where the ribbon made of non-woven fabric was sealed (so as to generate two edges, one intended to become the upper edge of a vertical strip includable in a sheer vertical blind and the other intended to become the lower edge of another strip), the vertical strips includable in a sheer vertical blind and made by means of the apparatus the object of the invention are equippable, at both ends, with a portion of ribbon made of non-woven fabric. This is an advantage. Cutting non-varnished fabric indeed in-duces faceting. If the band is made of non-varnished fabric, cutting the band into stretches (intended to become vertical strips includable in a sheer vertical blind) by means of the separation means would therefore cause fraying. The presence of the non-woven fabric advantageously prevents the formation of said fraying.

Other innovative features of the present invention are disclosed in the description below and mentioned in the dependent claims.

According to an aspect of the invention, said apparatus comprises further separation means adapted to make a through cut transversely in a further band including said ribbon and said further ribbon joined to each other at respective transverse edges, said further separation means being adapted to make a through cut in said further band so as to divide the latter at least into said ribbon and said further ribbon.

According to this aspect of the invention, like the above-mentioned stretches and sub-stretches of band intended to become vertical strips includable in a sheer vertical blind, also the ribbons made of non-woven fabric are arranged joined to one another to form a further band which is also preferably wound on itself to form a reel.

Preferably, the second gripping means disconnect from the aforesaid further band (that is, from the ribbon after it was cut from the remaining part of further band) following the cut made by the further separation means and a resting of the ribbon thus obtained on said portion of said band.

According to another aspect of the invention, said first joining means, said separation means and said second joining means are placed at respective stages of said apparatus, said first movement means:

following a mutual connection between said ribbon and said portion of said band by said first joining means, being adapted to translate said first gripping means over said support surface so that said separation means may make said cut in said ribbon and in said portion of said band;

following a division, by said separation means, of said ribbon into said first and second portions and a division, by said separation means, of said band into said first and second stretches, being adapted to translate said first gripping means over said support surface so that said second joining means may mutually connect each coupling member of said pair and said first portion of said ribbon;

following a mutual connection between said further ribbon and said further portion of said second stretch of said band by said first joining means, being adapted to translate said first gripping means over said support surface so that said separation means can make said cut in said further ribbon and in said further portion of said second stretch of said band;

following a division, by said separation means, of said further ribbon into said first and second portions and a division, by said separation means, of said second stretch of said band into said first and second sub-stretches, being adapted to translate said first gripping means over said support surface so that said second joining means may mutually connect each coupling member of said further pair and said first portion of said further ribbon.

According to another aspect of the invention, said first joining means are adapted to mutually connect said ribbon and said portion of said band, as well as said further ribbon and said further portion of said second stretch of said band, by textile heat sealing.

According to this aspect of the invention, by using heat sealing, gluing the non-woven fabric ribbon to the band may advantageously be avoided.

According to another aspect of the invention, said second joining means are adapted to mutually connect each coupling member of said pair and said first portion of said ribbon, as well as each coupling member of said further pair and said first portion of said further ribbon, by means of ultrasonic sealing.

Similar to the foregoing for the aspect of the invention immediately above, according to this aspect, by using ultrasonic sealing, gluing each coupling member to the ribbon made of non-woven fabric may advantageously be avoided.

According to another aspect of the invention, said third gripping means comprise gas-operated means (preferably, a pair of vacuum pumps), including a pair of suction mouths at each of which said gas-operated means are adapted to create a negative pressure, said gas-operated means being adapted to create, at each of said suction mouths, a sufficiently intense negative pressure so that when a coupling member of said pair or of said further pair is at said suction mouth, said coupling member is connected to said suction mouth, said gas-operated means being further adapted to make said negative pressure fail, at each of said suction mouths and after said negative pressure was created at said suction mouth with a coupling member of said pair or of said further pair at said suction mouth, so as to disconnect said coupling member from said suction mouth.

Another object of the invention is a method for making a plurality of vertical strips includable in a sheer vertical blind, said method being implementable by means of the apparatus the object of the invention and comprising the following steps:

a) preparing:
  a support surface;
  a band at least partly made of flexible material;
  a first plurality of ribbons, each of which at least partly made of non-woven fabric;
  a second plurality of pairs of coupling members, each coupling member of each pair of said second plurality comprising a base and a slot;

b) dragging said band on said support surface by a transverse edge of said band;

c) dragging a ribbon of said first plurality on said band so that said ribbon is rested on a portion of said band not including said transverse edge of said band whereby the latter was dragged in step b),
  said ribbon being dragged on said band so that said ribbon at least partly opposes said portion of said band not including said edge of said band whereby the latter was dragged in step b),
  said ribbon being further dragged on said band so that said ribbon is rested on said band transversely to the latter;

d) mutually connecting, preferably by so-called "textile" heat sealing, said ribbon dragged in step c) and said portion of said band not including said transverse edge of said band whereby the latter was dragged in step b);

e) making a through cut longitudinally in said ribbon dragged in step c) and simultaneously transversely in said band at said portion of the latter not including said edge of said band whereby the latter was dragged in step b), so as to divide said ribbon dragged in step c) into a first portion and a second portion, and said band, at said portion thereof not including said edge of said band whereby the latter was dragged in step b), into:
  a stretch extending from:
    said edge of said band whereby the latter was dragged in step b) toward
    a transverse edge of said band, opposite to said edge of said band whereby the latter was dragged in step b), and formed following said cut (made in this step),
  an end section of said stretch of said band extending from said edge of said band, opposite to said edge of said band whereby the latter was dragged in step b) being covered by said first portion of said ribbon and the remaining part of said band (said remaining part) extending from:
    a transverse edge of said band opposing said transverse edge of said band, opposite to said edge of said band whereby the latter was dragged in step b), and it also formed following said cut (made in this step)
  toward
    a transverse edge of said band, opposite to said transverse edge of said band opposing said transverse edge of said band, opposite to said edge of said band whereby the latter was dragged in step b), an end section of said remaining part of said band (said end section) extending from said transverse edge of said band opposing said transverse edge of said band, opposite to said edge of said band whereby the latter was dragged in step b) being covered by said second portion of said ribbon;

f) resting a pair of coupling members of said second plurality on said first portion of said ribbon at said bases and with said slots projecting past said transverse edge of said band, opposite to said edge of said band whereby the latter was dragged in step b), said coupling members of said pair being rested on said first portion of said ribbon on opposite sides with respect to a longitudinal axis of symmetry of said band;

g) mutually connecting, preferably by means of ultrasonic sealing, said first portion of said ribbon and each coupling member of said pair rested on said ribbon in step f), so that said stretch of said band may serve as vertical strip includable in a sheer vertical blind;

h) if there is a need to make another vertical strip includable in a sheer vertical blind, returning to step b):

dragging, on said support surface, said remaining part of said band obtained in step e), by said transverse edge of said band opposing said transverse edge of said band, opposite to said edge of said band whereby the latter was dragged in step b), and formed following said cut made in step e), dragging, in step c), another ribbon of said first plurality and resting, in step f), another pair of coupling members of said second plurality.

According to an aspect of the invention of method, each of said coupling members of each pair of said second plurality arranged in step a) comprises:

a first recess at said base, in step f), said first portion of said ribbon dragged in step c) being at least partly accommodated in said first recess when said coupling member is rested on said first portion of said ribbon dragged in step c);

a second recess at a stretch of an edge of said slot, said stretch of said edge of said slot being opposite to said base of said coupling member, in each of said coupling members of each pair of said second plurality, said first and second recesses facing mutually opposite sides.

When the vertical strips are hung on the hooks of a sheer vertical blind, which vertical strips are made by implementing the method of the invention according to this aspect, the two coupling members which are hung on a same hook (and which therefore are sealed to different strips) are opposed to each other on the side of the first recess so that the second recesses face opposite sides (that is, they are not opposing). By inserting the hook into the two slots of said two coupling members, respectively, the hook keeps the two coupling members sandwiched against each other by virtue of the presence of the second recesses. Advantageously therefore, there is no need for the coupling members to be provided with mutual connection components therebetween. According to this aspect of the invention, the coupling members of each pair of the second plurality may further advantageously be equal to one another. In light of the foregoing, there is no need to mutually connect two coupling members before a hook is inserted therein. Advantageously, the installation and possible disassembly operations (if the vertical strips have, for example, to be washed) of a sheer vertical blind including vertical strips made by implementing the method of the invention are therefore quicker with respect to the same operations carried out with the known vertical strips of this type.

BRIEF DESCRIPTION OF THE DRAWINGS

Further objects and advantages of the present invention will become apparent from the following detailed description of exemplary embodiments thereof and from the accompanying drawings, merely provided by way of non-limiting explanation, in which.

DETAILED DESCRIPTION OF SOME PREFERRED EMBODIMENTS OF THE INVENTION

Hereinafter in the present description, a figure may be illustrated also with reference to elements not expressly indicated therein but indicated in other figures instead. The scale and proportions of the various elements depicted do not necessarily correspond to the real ones.

Figure 1:
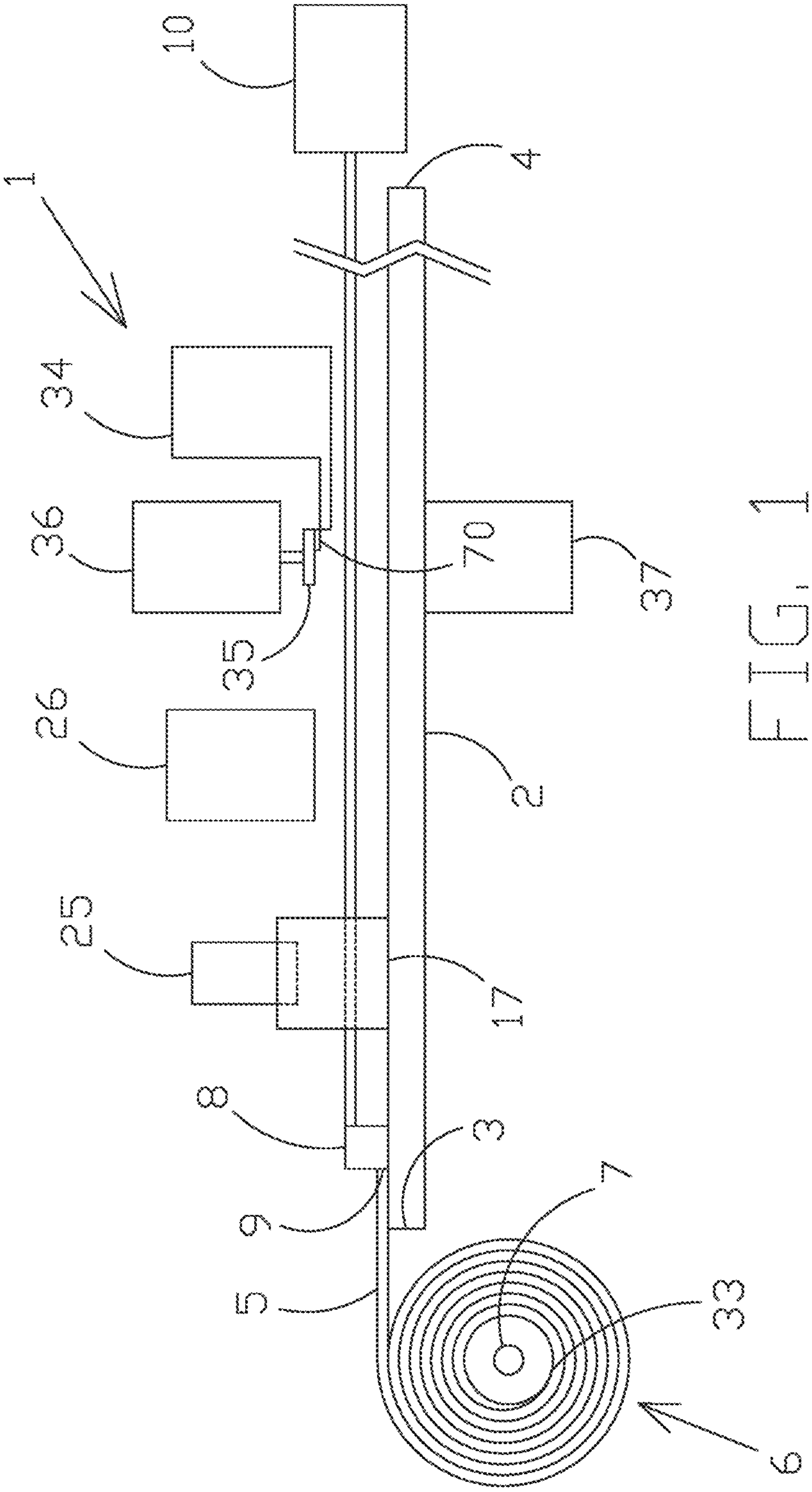
FIGS. 1 and 2 show a diagrammatic view of an apparatus according to the present invention.

FIG. 1 shows an apparatus 1, according to the invention, by means of which a plurality of vertical strips includable in a sheer vertical blind may be made in at least partly automated manner.

Apparatus 1 comprises a support surface 2, by way of explanation substantially rectangular and preferably extending in length from a transverse edge 3 (corresponding to a short side of the rectangle like the support surface 2 preferably substantially is shaped) to a transverse edge 4 opposite to edge 3 (and therefore corresponding to the other short side of the rectangle like the support surface 2 preferably substantially is shaped).

The support surface 2 is preferably arranged horizontally and is preferably smooth so as to facilitate a sliding thereon of a band 5 at least partly made of a flexible material, preferably fabric. Said material is known and is the main com-ponent (by weight) of the vertical strips of the sheer vertical blinds. Band 5 is preferably wound on itself to form a reel 6 preferably fitted on a cylindrical body 7 free to rotate around the longitudinal axis thereof. The cylindrical body 7 is preferably close to edge 3 and the longitudinal axis around which the cylindrical body 7 is free to rotate is preferably parallel to edge 3. Reel 6 is fitted on the cylindrical body 7 so as to rotate, integrally with the latter, around the aforesaid longitudinal axis.

In FIG. 1, the edges 3 and 4, as well as the longitudinal axis of the cylindrical body 7, are arranged orthogonally to the plane of the sheet.

Apparatus 1 preferably comprises a gripper 8 (comprised in the above-mentioned "first gripping means") adapted to be reversibly connected to band 5 (that is, adapted to grip band 5) at a first transverse edge 9 thereof. Gripper 8 is translatable over the support surface 2, preferably parallel to the latter (and therefore, preferably horizontally), by means of a linear actuator 10 to which gripper 8 is connected. The linear actuator 10 is comprised in the above-mentioned “first movement means” and is preferably adapted to translate gripper 8 in the direction in which the support surface 2 extends in length (that is, preferably parallel to the long sides of the rectangle like the support surface 2 preferably substantially is shaped). When gripper 8 is connected to band 5 at edge 9 of the latter, a translation of gripper 8 by the linear actuator 10 determines a dragging of band 5 on the support surface 2. In particular, when gripper 8 is connected to band 5 at edge 9 of the latter, a distancing of gripper 8 from edge 3 by the linear actuator 10 determines a rotation of reel 6, together with the cylindrical body 7, around the above-mentioned longitudinal axis of said body 7 and consequently, an at least partial unwinding of reel 6 onto the support surface 2.

In FIG. 1, gripper 8 is close to edge 3 of the support surface 2 and is connected to band 5 at edge 9 of the latter.

The edge 9 of band 5 is preferably parallel to the edges 3 and 4 of the support surface 2.

Figure 2:
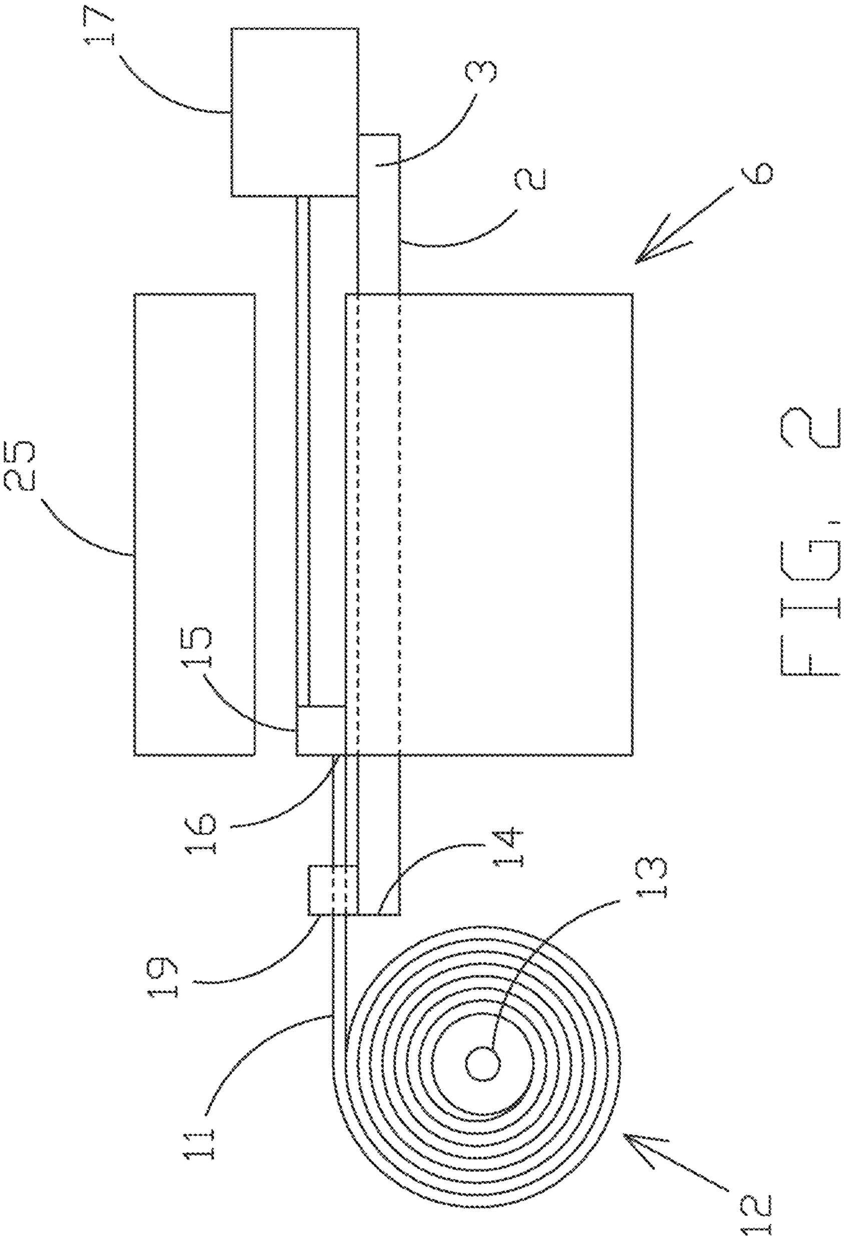

FIG. 2 shows a stage of apparatus 1 for the application, on band 5, of a further band 11 at least partly made, and preferably completely made, of non-woven fabric. Like band 5, band 11 is preferably wound on itself to form a reel 12 preferably fitted on a cylindrical body 13 free to rotate around the longitudinal axis thereof. The cylindrical body 13 preferably opposes a longitudinal edge 14 of the support surface 2 (corresponding to a long side of the rectangle like the support surface 2 preferably substantially is shaped), is preferably close to edge 3, and the longitudinal axis around which said body 13 is free to rotate is preferably parallel to edge 14. Reel 12 is fitted on the cylindrical body 13 so as to rotate, integrally with the latter, around the longitudinal axis of the cylindrical body 13. In FIG. 2, edge 14 and the longitudinal axis of the cylindrical body 13 are arranged orthogonally to the plane of the sheet.

Apparatus 1 preferably comprises a second gripper 15 (comprised in the above-mentioned “second gripping means”) adapted to be reversibly connected to band 11 (that is, adapted to grip band 11) preferably at a transverse edge 16 thereof. Gripper 15 is translatable over the support surface 2, preferably parallel to the latter (and therefore, preferably horizontally), by means of a second linear actuator 17 to which gripper 15 is connected. The linear actuator 17 is comprised in the above-mentioned “second movement means” and is preferably adapted to translate gripper 15 in the direction orthogonal to which the support surface 2 extends in length (that is, preferably parallel to the edges 3 and 4, and consequently preferably orthogonally to the direction in which gripper 8 is translatable by the linear actuator 10). When gripper 15 is connected to band 11 at edge 16 of the latter, a translation of gripper 15 by the linear actuator 17 determines a dragging of band 11 on the support surface 2. In particular, when gripper 15 is connected to band 11 at edge 16 of the latter, a distancing of gripper 15 from edge 14 by the linear actuator 17 determines a rotation of reel 12, together with the cylindrical body 13, around the above-mentioned longitudinal axis of said body 13 and consequently, an at least partial unwinding of reel 12 onto the support surface 2.

In FIG. 2, gripper 15 is close to edge 14 of the support surface 2 and is connected to band 11 at edge 16 of the latter.

The edge 16 of band 11 is preferably orthogonal to the edge 9 of band 5 and to the edges 3 and 4 of the support surface 2.

Figure 3:
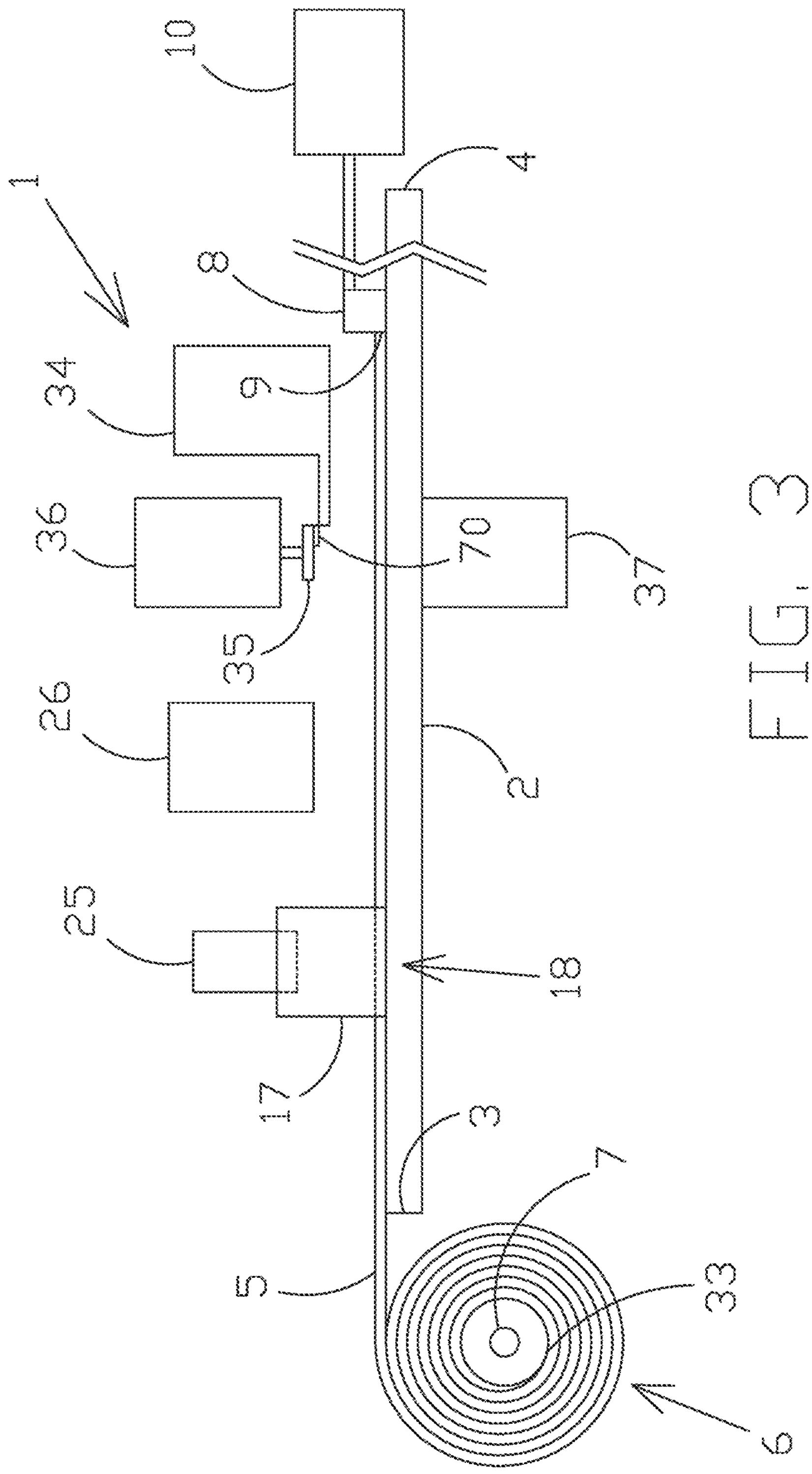
FIGS. 3 to 9 show a diagrammatic view of the apparatus in FIGS. 1 and 2 during the various production steps of a vertical strip includable in a sheer vertical blind.

FIG. 3 shows apparatus 1 in FIGS. 1 and 2 following an actuation of actuator 10 which determined a distancing of gripper 8 from edge 3 and consequently, a dragging of band 5 on the support surface 2. Said dragging was of an entity such that a portion 18 of band 5 not including edge 9 thereof is placed, in FIG. 3, at at least a stretch of the path travelable by gripper 15 at a translation thereof by actuator 17.

Incidentally, the edge 9 of band 5 preferably remains parallel to the edges 3 and 4 of the support surface 2 when band 5 is dragged by actuator 10.

Figure 4:
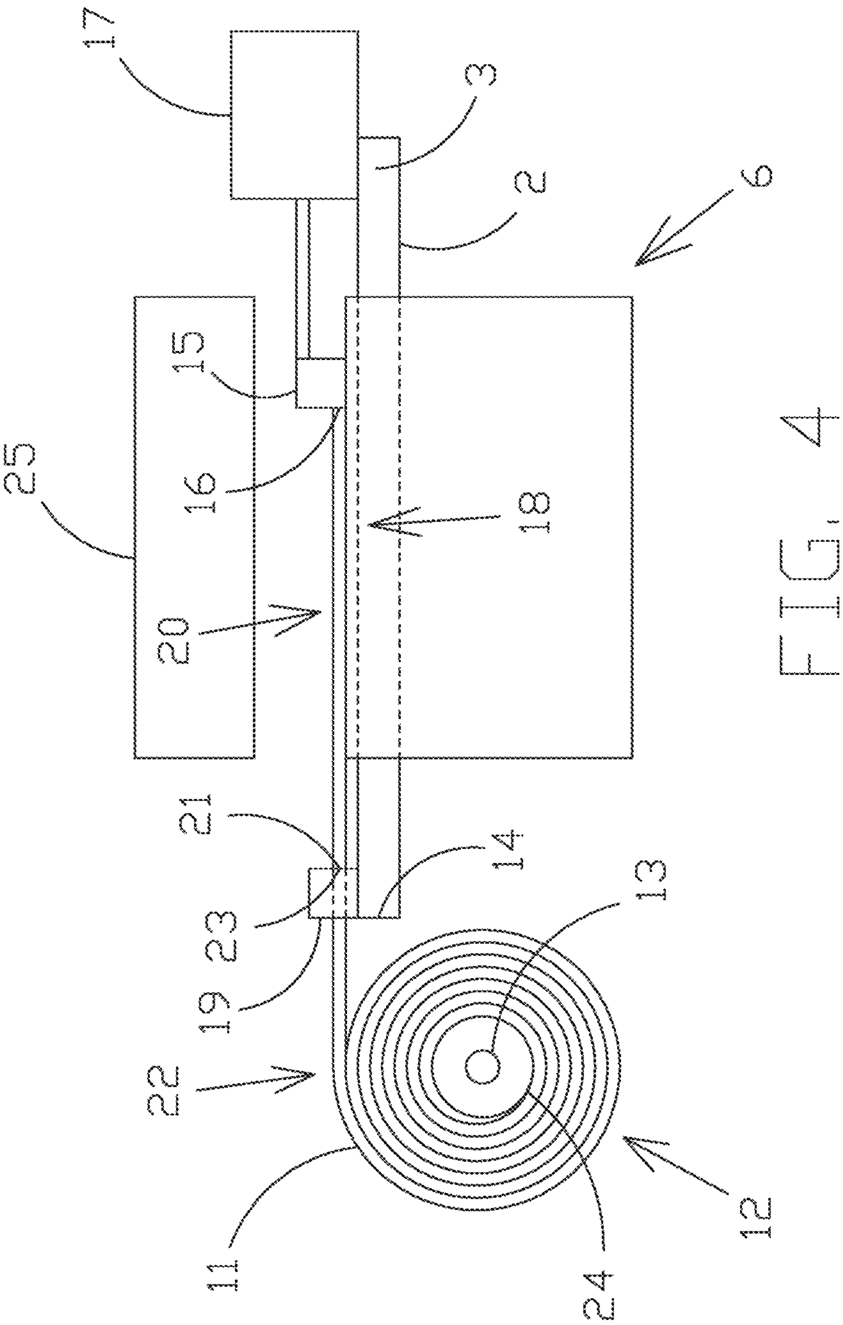

FIG. 4 shows apparatus 1 in FIG. 3 following an actuation of actuator 17 which determined a distancing of gripper 15 from edge 14 and consequently, a dragging of band 11 on band 5 at portion 18 of the latter.

Apparatus 1 preferably comprises a cutting device 19 preferably interposed between reel 12 and edge 14 of the support surface 2. Device 19 is comprised in the above-mentioned “further separation means” and is adapted to make a through cut transversely in band 11. FIG. 4 shows band 11 not only following a dragging of the latter on the portion 18 of band 5, but also following a through cut made by device 19 in band 11. Due to said cut, band 11 was divided into a first stretch 20 (on the right in FIG. 4), identified above as “ribbon”, and extending from the edge 16 of band 11 to a second transverse edge 21 of the latter, opposite to edge 16 and formed following the aforesaid cut, and a second stretch 22 (on the left in FIG. 4) corresponding to the remaining part of band 11 and extending from a third transverse edge 23 of band 11 opposing edge 21 and also formed following the aforesaid cut, to a fourth transverse edge 24 of band 11, opposite to edge 23, and preferably at which band 11 is connected to the cylindrical body 13. Incidentally, the edge 24 of band 11 was opposite to edge 16 of the latter prior to the cut made by device 19. Ribbon 20 is preferably rectangular and has a length (corresponding to the distance between the edges 16 and 21) preferably equal to the width of band 5 (corresponding to the distance between the longitudinal edges of band 5).

Incidentally, the edge 16 of band 11 preferably remains orthogonal to the edge 9 of band 5 and to the edges 3 and 4 of the support surface 2 when band 11 is dragged by actuator 17.

Device 19 is preferably adapted to make a cut in band 11 parallel to edge 16 of the latter so that the edges 21, 23 and 24 preferably are parallel to edge 16.

Figure 5:
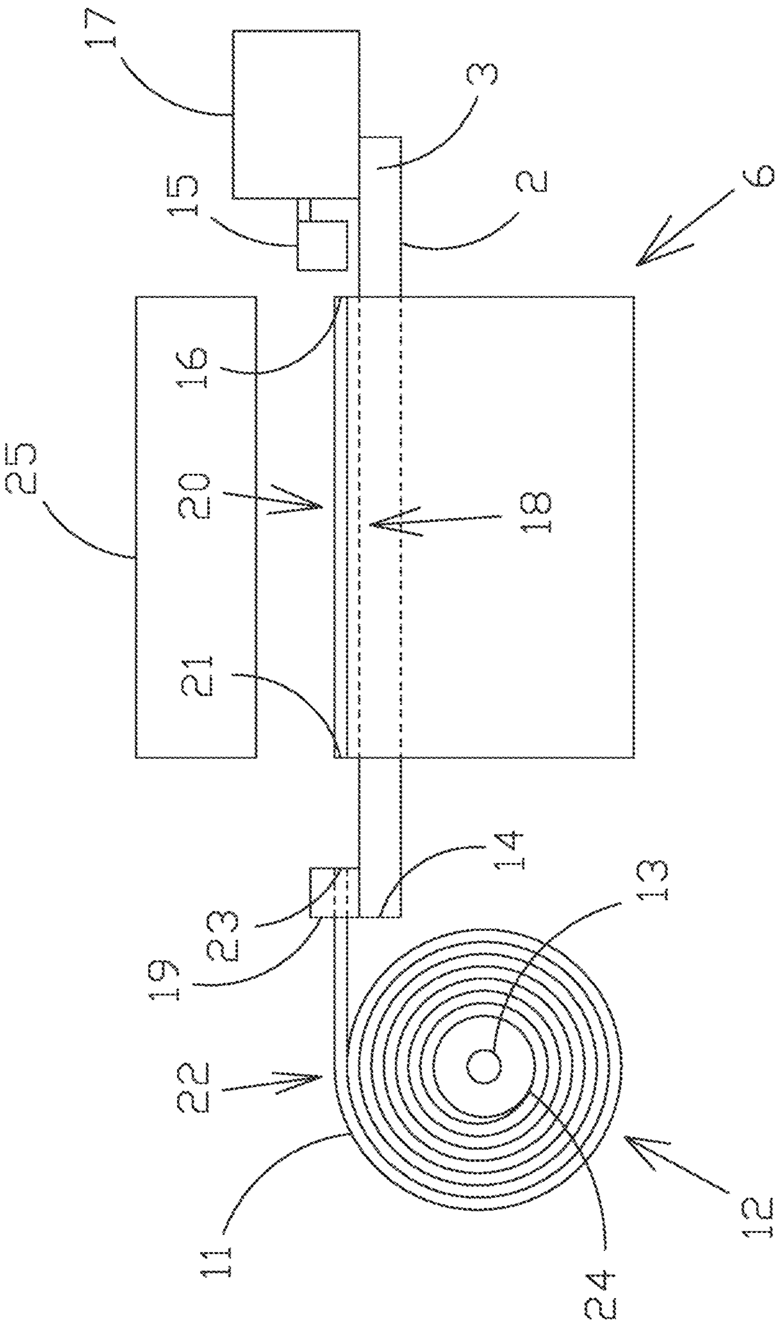

FIG. 5 shows apparatus 1 in FIG. 4 following a further actuation of actuator 17 which determined a further distancing of gripper 15 from edge 14 and consequently, a (further) dragging of ribbon 20 on band 5 at portion 18 of said portion. Due to said further dragging, ribbon 20 is opposed to the portion 18 of band 5, preferably so as to match the latter (that is, preferably so that the transverse edges 21 and 16 of ribbon 20 overlap the two longitudinal edges of band 5, respectively). FIG. 5 shows ribbon 20 not only following the aforesaid (further) dragging of the latter on the portion 18 of band 5, but also following a disconnection of gripper 15 from ribbon 20. Due to said disconnection, ribbon 20 rests transversely on band 5 at portion 18 of the latter. Incidentally, ribbon 20, and band 11 in general, is draggable on the support surface 2 by actuator 17 with the interposition of the portion 18 of band 5 between ribbon 20 and the support surface 2.

Apparatus 1 preferably comprises a joining device 25 preferably overlapping the support surface 2 at at least a stretch of the path travelable by gripper 15 at a translation thereof by actuator 17. Namely, device 25 is preferably in such a position to be overlapped to ribbon 20 as well as transversely resting on band 5 at portion 18 of the latter. Device 25 is comprised in the above-mentioned “first joining means" and is adapted to mutually connect the ribbon 20 and the portion 18 of band 5 preferably by textile heat sealing. FIG. 5 shows ribbon 20 not only following the aforesaid (further) dragging of the latter on the portion 18 of band 5 and of the disconnection of gripper 15 from ribbon 20, but also following a mutual connection of the ribbon 20 to portion 18 of band 5 by device 25.

Figure 6:
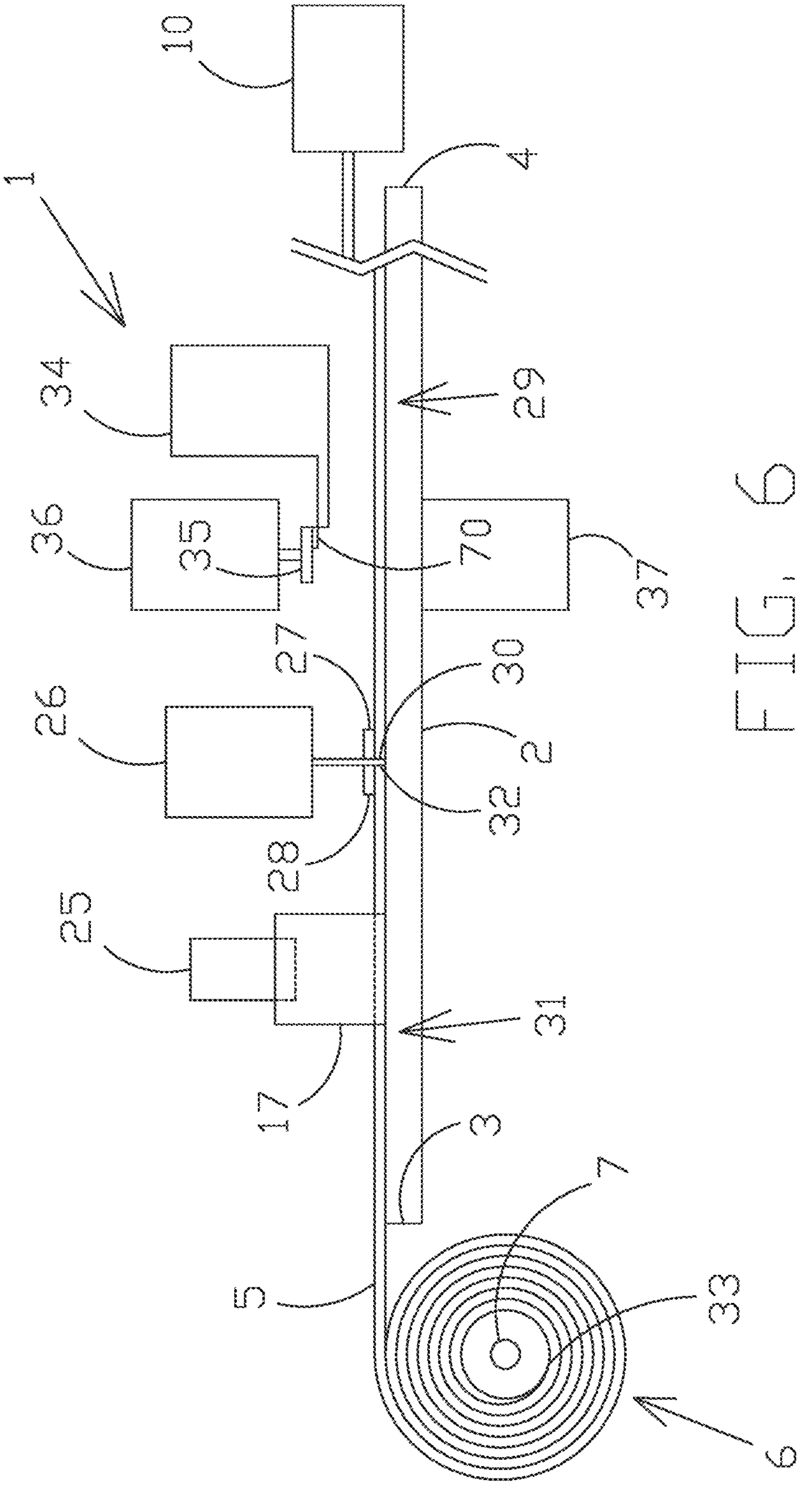

FIG. 6 shows apparatus 1 in FIG. 5 following an actuation of actuator 10 which determined a further distancing of gripper 8 from edge 3 and consequently, a further dragging of band 5, together with ribbon 20, on the support surface 2. Said further dragging was of an entity such that the portion 18 of band 5, together with ribbon 20 connected thereto, is placed, in FIG. 6, at a stage of apparatus 1 for cutting band 5. Namely, apparatus 1 comprises another cutting device 26 preferably placed on the side opposite to the cylindrical body 7 with respect to device 25 (so that the latter is preferably interposed between the cylindrical body 7 and device 26). Device 26 is comprised in the above-mentioned "separation means" and is adapted to make a through cut longitudinally in ribbon 20 and simultaneously transversely in band 5 at portion 18 of the latter where ribbon 20 is connected. In other words, device 26 is adapted to make a through cut in ribbon 20 from edge 16 to edge 21 and simultaneously a through cut in the portion 18 of band 5 from one to the other of the two longitudinal edges of band 5. FIG. 6 shows band 5 not only following the aforesaid further dragging of band 5, together with ribbon 20, on the support surface 2, but also following a through cut made by device 26 in ribbon 20 and in portion 18 of band 5. Due to said cut, preferably made by means of a discoidal rotating blade, ribbon 20 was divided into a first portion 27 (on the right in FIG. 6) and a second portion 28 (on the left in FIG. 6). Due to the aforesaid cut, band 5, at portion 18, was divided into a first stretch 29 (on the right in FIG. 6), extending from edge 9 to a second transverse edge 30 of band 5, opposite to edge 9 and formed following the cut made by device 26, and a second stretch 31 (on the left in FIG. 6), corresponding to the remaining part of band 5 and extending from a third transverse edge 32 of band 5 opposing edge 30 and also formed following the cut made by device 26, to a fourth transverse edge 33 of band 5, opposite to edge 32, and preferably at which band 5 is connected to the cylindrical body 7. Incidentally, the edge 33 of band 5 was opposite to edge 9 of the latter prior to the cut made by device 26. As shown in FIG. 6, an end section of the stretch 29 of band 5 extending from edge 30 is covered by the portion 27 of ribbon 20. Similarly, an end section of the stretch 31 of band 5 extending from edge 32 is covered by the portion 28 of ribbon 20.

Preferably, following the aforesaid further dragging of band 5, together with ribbon 20, on the support surface 2, actuator 17 is actuated so as to move gripper 15 close to edge 14, placing it in a position such that gripper 15 may be connected to band 11 at edge 23 of the latter. Therefore, gripper 15 connects to band 11 at edge 23 of the latter so that the stretch 22 of band 11 is draggable on the support surface 2, with a further unwinding of reel 12, following an actuation of actuator 17 which determines a distancing of gripper 15 from edge 14.

Device 26 is preferably adapted to make a cut in ribbon 20 and in portion 28 of band 5 parallel to edge 9 of the latter so that the edges 30, 32 and 33 preferably are parallel to edge 9 and orthogonal to the edges 16 and 21 of ribbon 20.

Figure 7:
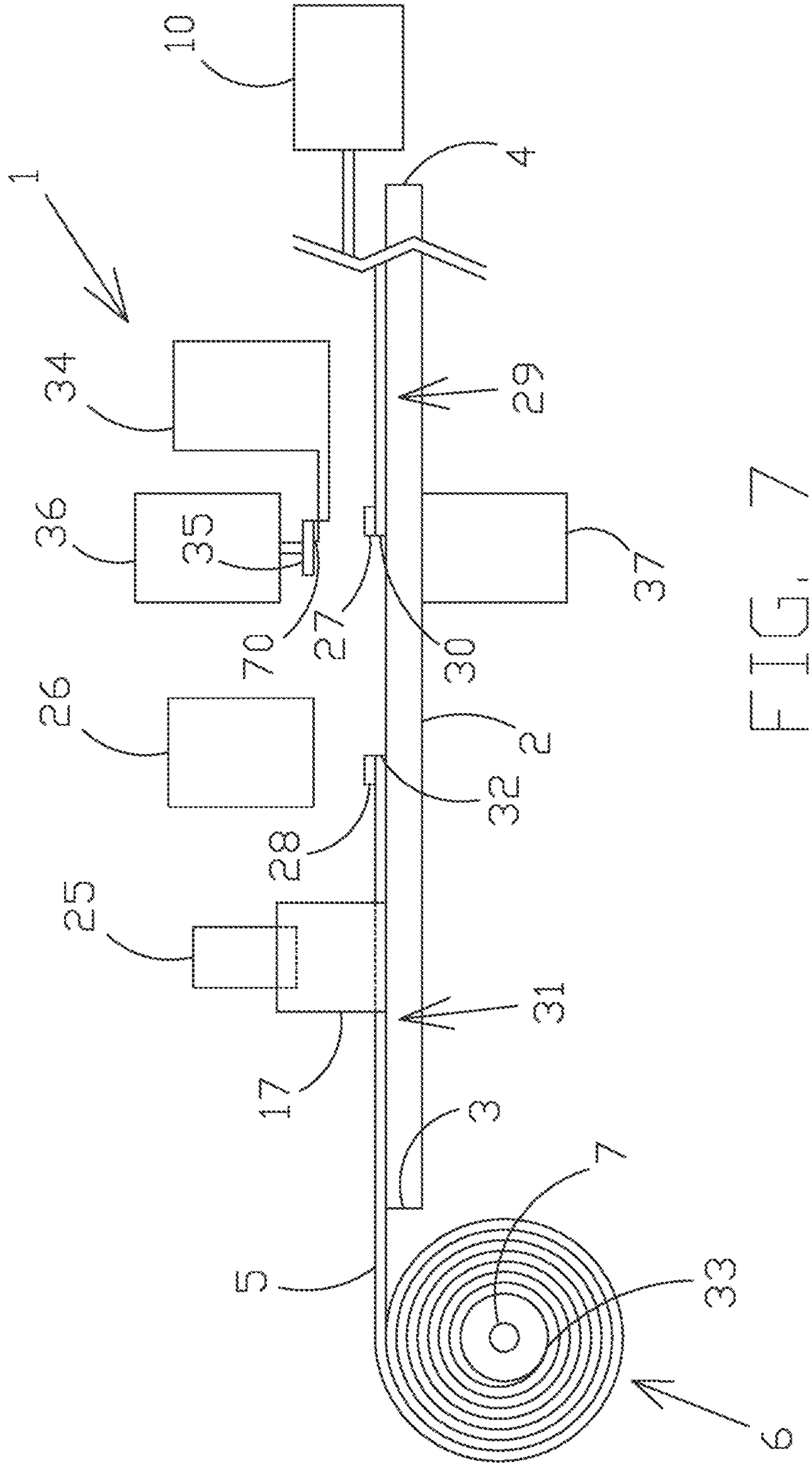
Figure 10:
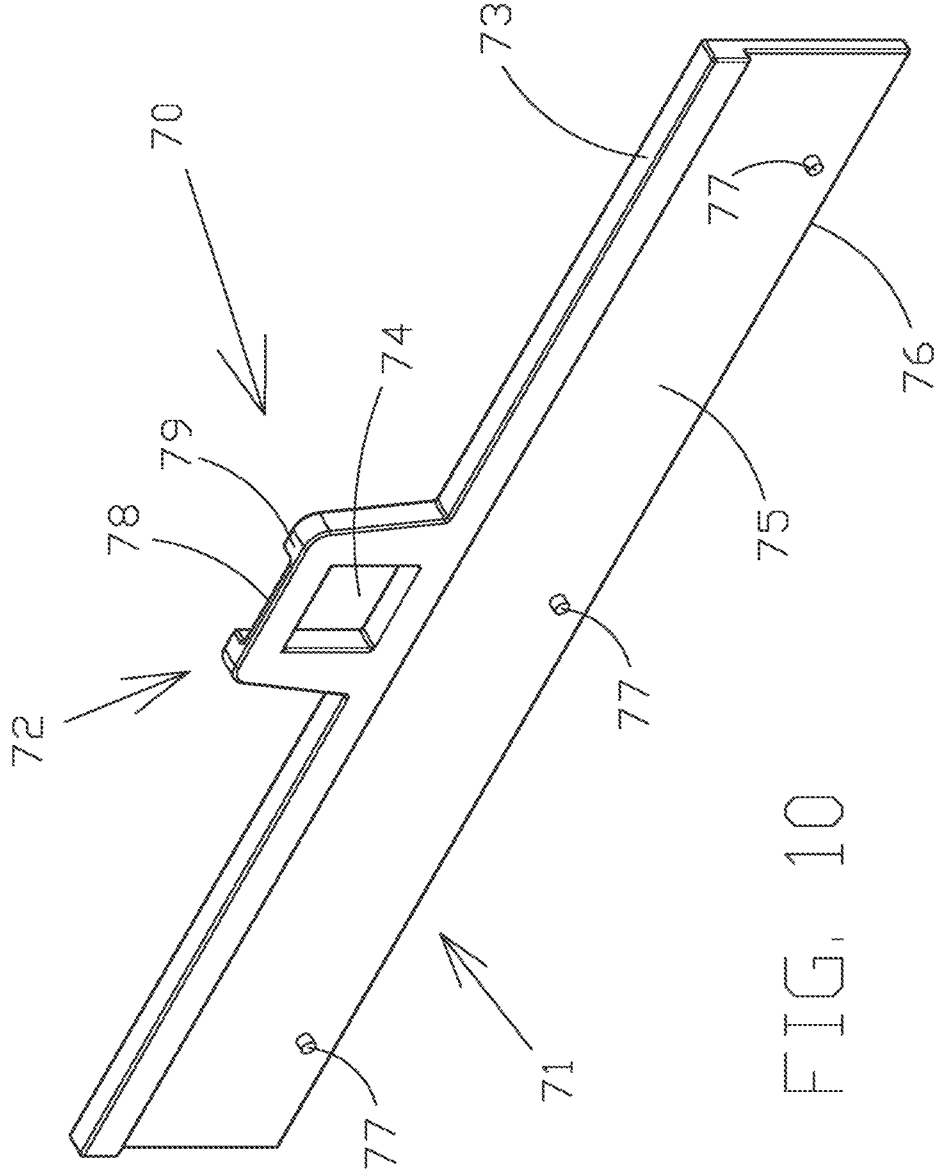
FIG. 10 shows a coupling member includable by the apparatus in FIGS. 1 and 2 in the above-mentioned vertical strip for a sheer vertical blind.

FIG. 7 shows apparatus 1 in FIG. 6 following an actuation of actuator 10 which determined a further distancing of gripper 8 from edge 3 and consequently, a (further) dragging of the stretch 29 of band 5, together with the portion 27 of ribbon 20, on the support surface 2. Said further dragging was of an entity such that the end section of the stretch 29 of band 5 extending from edge 30 and covered by the portion 27 of ribbon 20 is placed, in FIG. 7, at a stage of apparatus 1 for the application, on the portion 27 of ribbon 20, of a pair of coupling members 70, one of which is shown in FIG. 10.

The coupling member 70 comprises a substantially flat base 71 preferably substantially shaped as a rectangle, and a slot 72, also substantially flat, substantially coplanar to base 71 and preferably substantially shaped as an isosceles trapezoid. Slot 72, at the long base of the isosceles trapezoid like it is preferably shaped, is centrally connected to base 71 at an edge 73 of the latter corresponding to a long side of the rectangle as base 71 is preferably shaped. Slot 72 comprises a preferably rectangular through hole 74 preferably arranged with the long and short sides of the rectangular edge thereof parallel to the long and short sides of the rectangle, respectively, like base 71 preferably substantially is shaped. The coupling member 70 preferably comprises, at base 71, a preferably substantially rectangular recess 75 (defined above as "first recess") preferably having such an extension as to involve almost all of base 71. Namely, recess 75 preferably extends from the edge 76 of base 71, opposite to edge 73 (to which slot 72 is connected and therefore corresponding to a long side of the rectangle like base 71 is preferably shaped), preferably for the whole length of edge 76 and, at a constant depth, up to close the edge 73. The depth of recess 75 is preferably almost half the thickness of base 71. Base 71 comprises, at recess 75, a plurality of teeth 77, by way of example three, and having a height preferably corresponding to the depth of recess 75. The teeth 77 preferably are cylindrical and aligned with one another parallel to the edges 73 and 76. The teeth 77 preferably are closer to edge 76 than to edge 73. Of the three teeth 77, one is preferably in central position with respect to edge 76, and the other two teeth 77, lying on opposite sides with respect to said tooth 77 in central position, preferably are equally spaced from the latter. Also slot 72 preferably comprises a recess 78 (previously defined as "second recess") preferably extending up to hole 74 starting from a middle section of the edge 79 of slot 72 corresponding to the short base of the isosceles trapezoid, like slot 72 preferably substantially is shaped. Incidentally, edge 79 is opposite to base 71. The recesses 75 and 78 are made on opposite faces of base 71 and slot 72, respectively, that is they face mutually opposite sides.

Incidentally, the height of the isosceles trapezoid, like slot 72 of each of the coupling members 70 preferably substantially is shaped, has a considerably shorter length than the one of each of the short sides of the rectangle as base 72 of said coupling member 70 preferably substantially is shaped.

Apparatus 1, at the aforesaid stage of the application of a pair of coupling members 70, preferably comprises a device 34 adapted to accommodate a plurality of coupling members 70 which preferably are equal to one another and are stacked on one another so as to form two stacks. Device 34 overlaps the support surface 2 and is preferably placed on the side opposite to device 25 with respect to device 26 (so that the latter is preferably interposed between the devices 25 and 34). The coupling members 70 in each of the two aforesaid stacks of coupling members 70 overlap one another with the recesses 75 facing the support surface 2 and the edges of the bases 71 and the slots 72 vertically aligned, respectively. The two stacks of coupling members 70 preferably are arranged beside each other so that the edges 73 of the coupling members 70 of the two aforesaid stacks are mutually parallel and lie in a single plane preferably arranged vertically and parallel to the edges 3 and 4 of the support surface 2 the edge 9 of band 5. The two stacks of coupling members 70 are further arranged beside each other preferably so that the slots 72 of the coupling members 70 of the two aforesaid stacks all lie on the same side with respect to the aforesaid plane where the edges 73 lie, and namely, so that the slots 72 face device 26 with respect to the bases 71.

The teeth 77, having a height preferably substantially corresponding to the depth of the recesses 75, advantageously keep the coupling members 70 arranged horizontally in the two aforesaid stacks.

Apparatus 1 preferably comprises a pair of vacuum pumps 35 (comprised in the above-mentioned "third gripping means"), each of which including a suction mouth at which the vacuum pump 35 is adapted to create a negative pressure. The vacuum pumps 35 overlap the support surface 2, with the suction mouths facing the latter, and are interposed between the devices 26 and 34.

Device 34 preferably further comprises a linear actuator for each stack of coupling members 70, which linear actuator is adapted to push the coupling member 70 occupying the lowest position in the stack (that is, closest to the support surface 2) out of the stack of which it is a part and towards one of the two vacuum pumps 35. Namely, the two coupling members 70 occupying the lowest position of the two stacks, respectively, are ejected from the stacks towards the two vacuum pumps 35 at the two suction mouths of the latter, respectively, at an actuation of the actuators of device 34. Each vacuum pump 35 is adapted to create a sufficiently intense negative pressure so that when a coupling member 70 is at the suction mouth of said pump, said coupling member 70 is connected to said suction mouth. Each time the actuators of device 34 are actuated and the two coupling members 70 occupying the lowest position of the two stacks, respectively, are ejected from the stacks towards the two vacuum pumps 35 at the two suction mouths of the latter, respectively, the vacuum pumps 35 are actuated so that said two coupling members 70 ejected from the two stacks, respectively, remain connected to the vacuum pumps 35. The latter, when connected to a pair of coupling members 70, respectively, keep the same with recess 75 facing the support surface 2. When connected to one of the vacuum pumps 35, a coupling member 70 is connected to said vacuum pump 35 at base 71 thereof on the side opposite to recess 75 (i.e., the suction by the vacuum pump 35 of a coupling member 70 is preferably applied on base 71 of the coupling member 70 on the opposite side with respect to recess 75). Following the ejection of two respective coupling members 70 from the two aforesaid stacks, the two stacks translate downwards due to the weight force so that there are two other coupling members 70 respectively occupying the lowest position of the two stacks, therefore which may be respectively ejected from the stacks by the actuators of device 34. In light of the foregoing, device 34 substantially serves as "loader" of coupling members 70 for the two vacuum pumps 35.

The vacuum pumps 35 are connected to a linear actuator 36 comprised in the above-mentioned "third movement means" and adapted to vertically translate the vacuum pumps 35 between at least a first position at which the vacuum pumps 35 are at a given distance from the support surface 2 and may receive a pair of coupling members 70 from the actuators of device 34, and a second position at which, when the vacuum pumps 35 are connected to a pair of coupling members 70, respectively, the latter are in contact with the support surface 2.

In FIG. 7, the vacuum pumps 35 are in the aforesaid first position and a pair of coupling members 70 was ejected from the two aforesaid stacks and is connected to the two vacuum pumps 35.

As mentioned above, FIG. 7 shows apparatus 1 in FIG. 6 following an actuation of actuator 10 which determined a further distancing of gripper 8 from edge 3 and consequently, a (further) dragging of the stretch 29 of band 5, together with the portion 27 of ribbon 20, on the support surface 2. Specifically, said (further) dragging of the stretch 29 of band 5 was of an entity such that the portion 27 of ribbon 20 substantially lies below the vacuum pumps 35. Even more specifically, the aforesaid (further) dragging of the stretch 29 of band 5 was of an entity such that the portion 27 of ribbon 20 is in a position such that, at an actuation of actuator 36 which determines a movement of the vacuum pumps 35 from the first to the second position, the two coupling members 70 connected to the two vacuum pumps 35, respectively, are restable on the portion 27 of ribbon 20 at the respective bases 71, and more specifically at the respective recesses 75 (so that the teeth 70 penetrate the portion 27 of ribbon 20), with the slots 72 projecting past the edge 30 of the stretch 29 of band 5, with the recesses 78 facing upwards. The coupling members 70 are restable on the portion 27 of ribbon 20 on the opposite side with respect to a longitudinal axis of symmetry of band 5. Incidentally, each of the edges 73 and 76 of base 71 of each coupling member 70 has a shorter length than half the length of the edges 9 and 30 of the stretch 29 of band 5. Similarly, each of the edges of base 71 of each coupling member 70 corresponding to the short sides of the rectangle, like said coupling member 70 is preferably shaped, has a considerably shorter length than the one of each of the longitudinal edges of the stretch 29 of band 5.

Figure 8:
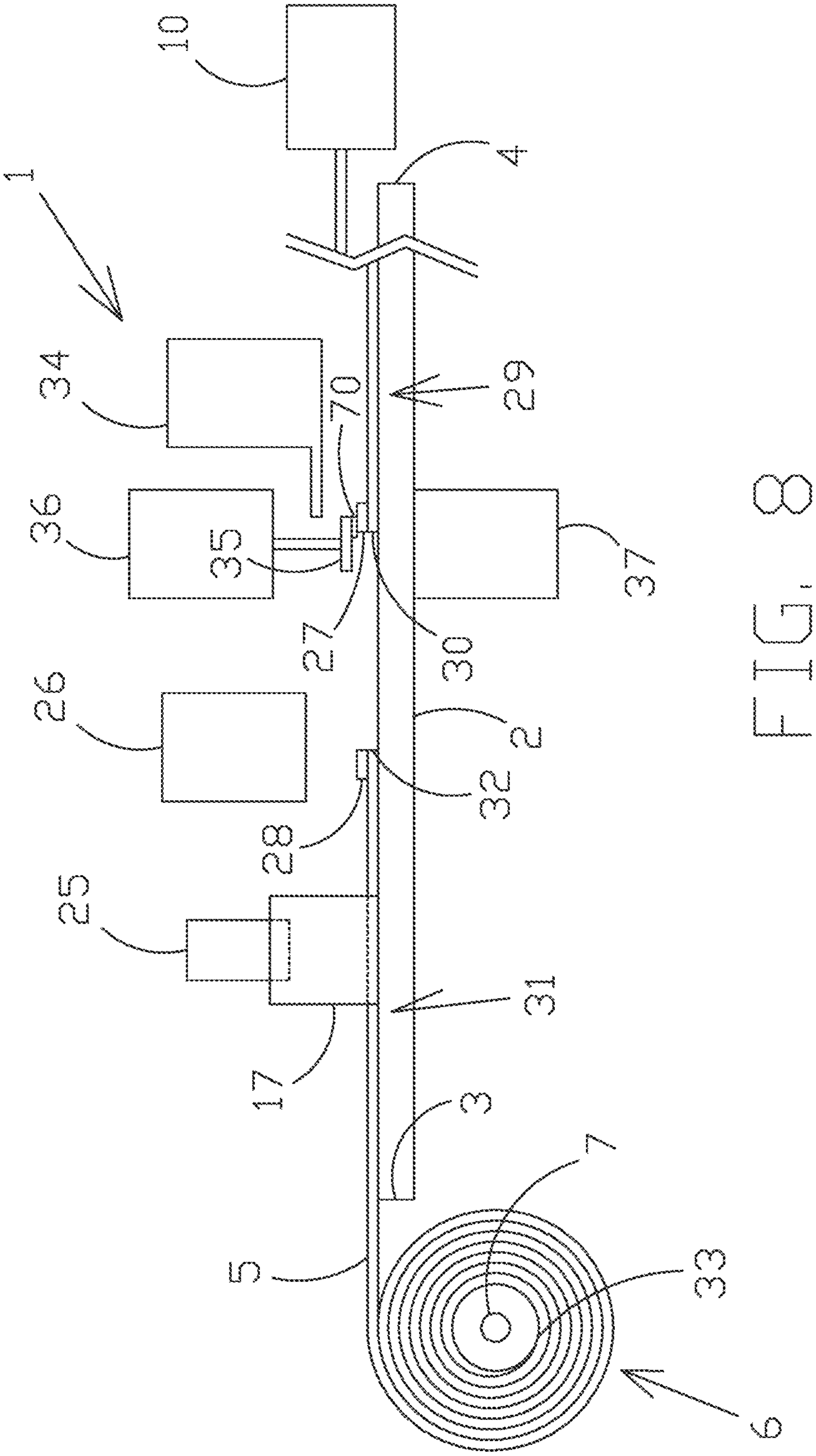

FIG. 8 shows apparatus 1 in FIG. 7 following an actuation of actuator 36 which determined a movement of the vacuum pumps 35 from the first to the second position. Due to this, the two coupling members 70 connected to the two vacuum pumps 35, respectively, were rested on the portion 27 of ribbon 20 at the respective bases 71, and namely, at the respective recesses 75, with the slots 72 projecting past the edge 30 of the stretch 29 of band 5, with the recesses 78 facing upwards.

FIG. 8 shows apparatus 1 in FIG. 7 not only following the aforesaid actuation of actuator 36, but also following a disconnection of the vacuum pumps 35 from the two coupling members 70 to which they were connected, therefore not generating the negative pressure at the suction mouths thereof. Despite said disconnection, the position of the vacuum pumps 35 shown in this drawing is such that the two aforesaid coupling members 70 are kept against the portion 27 of ribbon 20 by the vacuum pumps 35.

Apparatus 1 preferably comprises a joining device 37, preferably lying below the support surface 2 so as to be opposite to the vacuum pumps 35 when the latter are in the position shown in FIG. 8. Device 37 is comprised in the above-mentioned "second joining means" and is adapted to mutually connect, preferably by ultrasonic sealing, the portion 27 of ribbon 20 and each of the aforesaid coupling members 70 kept against said portion 27 by the vacuum pumps 35.

FIG. 8 shows apparatus 1 not only following an actuation of actuator 36 which determined a movement of the vacuum pumps 35 from the first to the second position and a disconnection of the vacuum pumps 35 from the two coupling members 70 to which they were connected, but also following a mutual connection, by device 37, of the portion 27 of ribbon 20 to each of the coupling members 70 kept against said portion 27 by the vacuum pumps 35.

In light of the foregoing, FIG. 7 shows apparatus 1 in FIG. 6 following an actuation of actuator 10 which determined a further distancing of gripper 8 from edge 3 and consequently, a (further) dragging of the stretch 29 of band 5, together with the portion 27 of ribbon 20, on the support surface 2, of such an entity as to allow the aforesaid mutual connection, by the device 37, of the portion 27 of ribbon 20 to each of the coupling members 70 kept against said portion 27 by the vacuum pumps 35.

Figure 9:
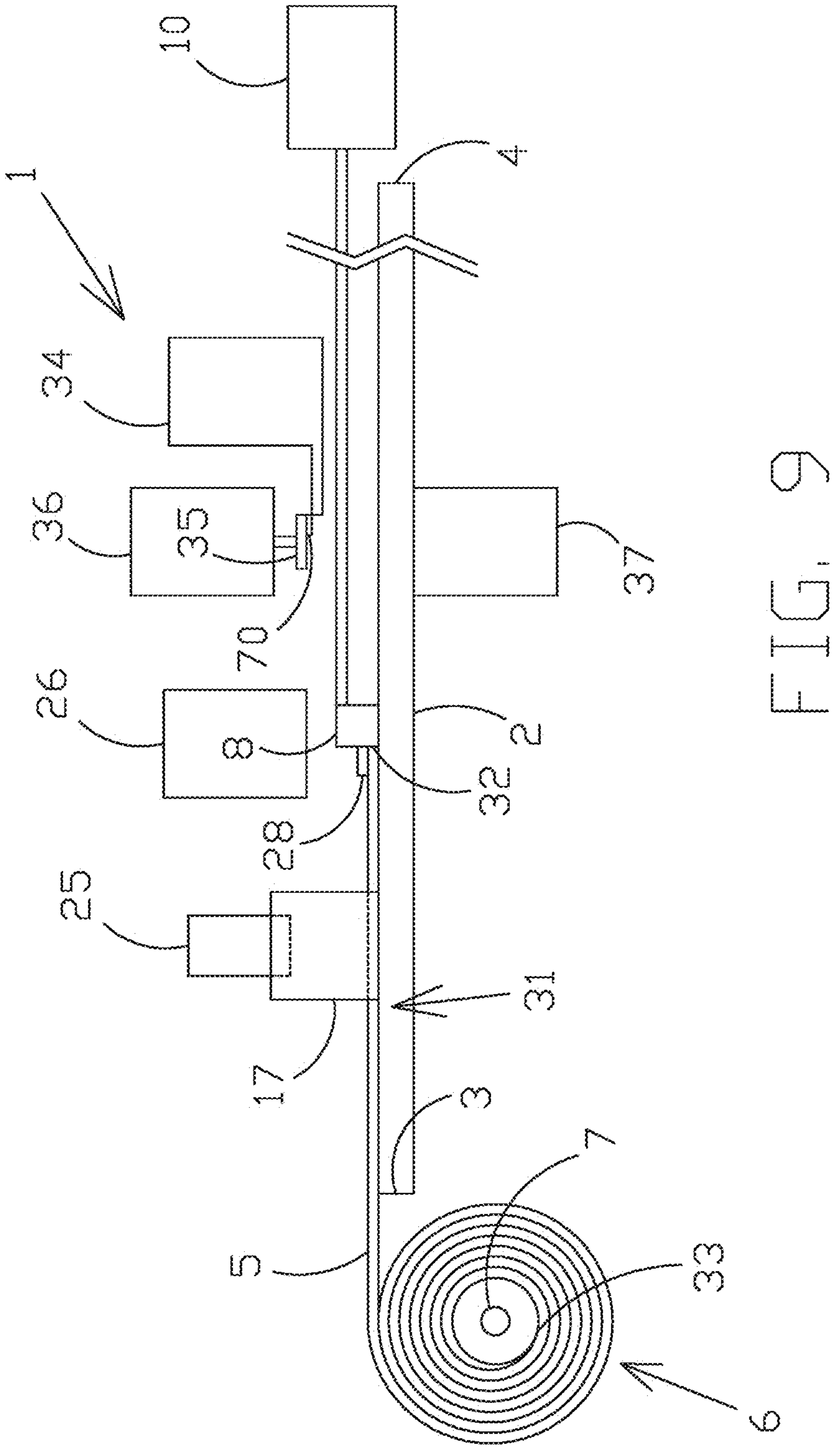

Once the aforesaid mutual connection is made, preferably by ultrasonic sealing, of the portion 27 of ribbon 20 to each of the coupling members 70 kept against said portion 27 by the vacuum pumps 35, actuator 36 is actuated so as to move the vacuum pumps 35 from the second position into the first position (as shown in FIG. 9) so as to be ready to receive a new pair of coupling members 70 from the actuator of device 34. Gripper 8 is also disconnected from the edge 9 of the stretch 29 of band 5. Said stretch 29 serves as vertical strip includable in a sheer vertical blind. Namely, strip 29 may be hung to a hook of a sheer vertical blind at edge 30. As mentioned above, in order to hang the strip which may be made by means of apparatus 1, two slots 72 of two coupling members 70 connected to different strips, respectively, are to be inserted in a same hook. Said two coupling members 70 (to be inserted into the same hook) are to be kept sandwiched against each other, preferably by means of a hand, so that said two coupling members mirror each other, with the recesses 75 facing one another (and consequently, with the recesses 78 facing opposite sides). By inserting a hook into the two slots 72 of the two coupling members 70 kept opposing each other as described above, once the grip is released, the hook keeps the two coupling members 70 sandwiched against each other.

Incidentally, rather than including band 11 and the cutting device 19, apparatus 1 could comprise a plurality of pre-cut ribbons. In this case, gripper 15, following a disconnection thereof from edge 16, is moved close to edge 14 by actuator 17 in such a position as to be connectable to the transverse edge of a further ribbon. Therefore, gripper 15 connects to said further ribbon so that the latter is draggable on the support surface 2 following an actuation of actuator 17 which determines a distancing of gripper 15 from edge 14.

As shown in FIG. 3, gripper 8, in switching from the configuration of apparatus 1 shown in FIG. 1 to the configuration of apparatus 1 shown in FIG. 3, has travelled the support surface 2, translating past device 34.

As shown in FIG. 9, following the disconnection of gripper 8 from edge 9 and a removal of strip 29 from the support surface 2, actuator 10 is actuated so as to move gripper 8 close to edge 3 of the support surface 2, into a position such that gripper 8 may be connected to edge 32 of the stretch 31 of band 5. In order to manufacture a new vertical strip for a sheer vertical blind, the above-described operations are repeated with gripper 8 connected to the edge 32 of the stretch 31 of band 5 rather than to the edge 9 of stretch 29 of the latter, with gripper 15 connected to the edge 23 of the stretch 22 of band 11 rather than to the edge 16 of stretch 20 of the latter, and with the vacuum pumps 35 connected, at the suction mouths thereof, to a further pair of coupling members 70 "dispensed" to the vacuum pumps 35 by device 34.

Namely, the stretch 31 of band 5 is dragged, by actuator 10, on the support surface 2 by gripper 8 so that a portion of stretch 31 (corresponding to a further portion of band 5 which is different from portion 18) not including edge 32 is placed at at least a stretch of the path travelable by gripper 15 at a translation thereof by actuator 17. A further ribbon obtained from band 11 by means of device 19 is transversely rested, by means of gripper 15 and actuator 17, on the stretch 31 of band 5 so that said further ribbon at least partly opposes said portion of stretch 31 not including edge 32. The aforesaid further ribbon is therefore connected to said portion of stretch 31 not including edge 32 by means of device 25. Actuator 10 is actuated again so as to further drag the stretch 31 of band 5 on the support surface 2 so that the aforesaid further ribbon is at device 26. The latter divides the aforesaid further ribbon into a first portion and a second portion, and the stretch 31 of band 5 into a first sub-stretch extending from edge 32 to a fifth transverse edge of band 5, opposite to edge 32, and formed following the cut made by device 26 in the stretch 31 of band 5, and a second sub-stretch corresponding to the remaining part of the stretch 31 of band 5 and extending from a sixth transverse edge of band 5 opposing the aforesaid fifth transverse edge, and also formed following the cut made by device 26 in the stretch 31 of band 5, to the edge 33 of band 5. In light of the foregoing, an end section of the aforesaid first sub-stretch of the stretch 31 of band 5 extending from the aforesaid fifth transverse edge is covered by the aforesaid first portion of the aforesaid further ribbon. Similarly, an end section of the aforesaid second sub-stretch of the stretch 31 of band 5 extending from the aforesaid sixth transverse edge is covered by the aforesaid second portion of the aforesaid further ribbon. Actuator 10 is actuated again so as to further slide the first sub-stretch of the stretch 31 of band 5 on the support surface 2 so that the aforesaid first portion of the aforesaid further ribbon is at the vacuum pumps 35. The aforesaid further pair of coupling members 70 is then rested, by means of the vacuum pumps 35 and actuating actuator 36, on the aforesaid first portion of the aforesaid further ribbon. The aforesaid further pair of coupling members 70 is connected to the aforesaid first portion of the aforesaid further ribbon by means of device 37. Once the mutual connection of the aforesaid first portion of the aforesaid further ribbon is made to each of the coupling members 70 of the aforesaid further pair, actuator 36 is actuated so as to move the vacuum pumps 35 from the second position to the first position so as to be ready to receive a new pair of coupling members 70 from the actuator of device 34. Gripper 8 is also disconnected from the edge 32 of the stretch 31 of band 5. The first sub-stretch of the stretch 31 of band 5 serves as further vertical strip includable in a sheer vertical blind. Further vertical strips includable in a sheer vertical blind are obtainable by repeating the above-described operations by dividing the second sub-stretch of the stretch 31 of band 5 into two further sub-sub-stretches, etcetera.

Another object of the invention is a method for making a plurality of vertical strips includable in a sheer vertical blind. Said method is implementable by means of apparatus 1 and comprises the steps listed below:

a) preparing:
   the support surface 2;
   band 5;
   a first plurality of ribbons 20;
   a second plurality of pairs of coupling members 70;
b) dragging band 5 on the support surface 2 by the transverse edge 9 thereof, preferably by means of gripper 8 and actuator 10;
c) dragging a ribbon 20 of the aforesaid first plurality on band 5 so that said ribbon 20 is rested, preferably by means of gripper 15, on the portion 18 of band 5 (not including edge 9) of actuator 17 and, if the ribbons 20 are part of reel 11, of the cutting device 19. Ribbon 20 is dragged on band 5 so that said ribbon 20 at least partly opposes the portion 18 of band 5. Ribbon 20 is also dragged on band 5 so that said ribbon 20 is rested on band 5 transversely to the latter;

d) mutually connecting, preferably by means of device 25, ribbon 20 dragged at step c) and the portion 18 of band 5;

e) making a through cut longitudinally in ribbon 20 dragged in step c) and simultaneously transversely in band 5 at portion 18 of the latter preferably by means of device 26 so as to divide said ribbon 20 (dragged in step c) into a first portion 27 and a second portion 28, and band 5, at portion 18 thereof, into:

a stretch 29 extending from edge 9 to the edge 30 of band 5 (opposite to edge 9 and formed following the cut made in this step). An end section of said stretch 29 extending from edge 30 is covered by portion 27 of said ribbon 20;

and the remaining part of band 5 corresponding to the above-mentioned stretch 31 extending from the edge 32 of band 5 (opposing the aforesaid edge 30, and it also formed following the cut made in this step) to edge 33 of the latter (opposite to the aforesaid edge 32). An end section of said stretch 31 extending from edge 32 is covered by the portion 28 of ribbon 20;

f) resting a pair of coupling members 70 of the aforesaid second plurality, preferably by means of the vacuum pumps 35, device 34 and actuator 36, on the portion 27 of ribbon 20 (dragged in step c) at the bases 71 and with the slots 72 projecting past edge 30. The coupling members 70 of the aforesaid pair are rested on the portion 27 of ribbon 20 on opposite sides with respect to a longitudinal axis of symmetry of band 5;

g) mutually connecting, preferably by means of device 37, the portion 27 of ribbon 20 (dragged in step c) and each coupling member 70 of the aforesaid pair rested on the portion 27 of ribbon 20 in step f) so that the stretch 29 of band 5 may act as vertical strip includable in a sheer vertical blind;

h) if there is a need to make another vertical strip includable in a sheer vertical blind, returning to step b):

dragging, on the support surface 2, the remaining part 31 of band 5 obtained in step e) by edge 32, dragging, in step c), another ribbon 20 of the aforesaid first plurality and resting, in step f), another pair of coupling members 70 of the aforesaid second plurality.

Based on the description provided for a preferred embodiment, it is obvious that some changes may be made by those skilled in the art without departing from the scope of the invention as defined by the following claims.

The invention claimed is:

1. An apparatus for making a plurality of vertical strips includable in a sheer vertical blind, said apparatus comprising:

a support surface;

a first gripper configured to be reversibly connected to a band at least partly made of flexible material at a first transverse edge of the band a first actuator connected to said first gripper and configured to translate the first gripper over said support surface so that when said first gripper is connected to said band, a translation of said first gripper by said first actuator causes a dragging of said band on said support surface;

a second gripper configured to be reversibly connected to a ribbon at least partly made of non-woven fabric, said second gripper being configured to be reversibly connected to said ribbon at a transverse edge of the ribbon;

a second actuator connected to said second gripper and configured to translate the second gripper over said support surface so that when said second gripper is connected to said ribbon, a translation of said second gripper by said second actuator causes a dragging of said ribbon on said support surface, said first and second actuators being configured to sufficiently translate said first and second grippers, respectively, over said support surface so that, and in such respective directions that, when said first and second grippers are connected to said band and said ribbon, respectively:

said band is draggable, by said first actuator, on said support surface so that a portion of said band not including said first transverse edge is placeable at at least a stretch of the path travelled by said second gripper at a translation thereof over said support surface by said second actuator, and said ribbon is draggable, by said second actuator, and restable on said portion of said band so that said ribbon at least partly opposes said portion of said band transversely to said band, so that said ribbon is draggable on said support surface, by said second actuator, with an interposition of said portion of said band between said support surface and said ribbon;

a first joining device configured to mutually connect said ribbon and said portion of said band following a resting of said ribbon on said portion of said band by said second actuator;

a cutter configured to make a through-cut longitudinally in said ribbon and simultaneously transversely in said band at said portion of the band following a mutual connection between said ribbon and said portion of said band by said first joining device, to divide said ribbon into a first portion and a second portion, and said band, at said portion thereof, into:

a first stretch extending from: said first transverse edge of said band toward a second transverse edge of said band, opposite to said first transverse edge, and formed following said cut made by said cutter, an end section of said first stretch of said band extending from said second transverse edge being covered by said first portion of said ribbon, and a second stretch corresponding to the remaining part of said band and extending from: a third transverse edge of said band, opposing said second transverse edge, and formed following said cut made by said cutter toward a fourth transverse edge of said band, opposite to said third transverse edge, an end section of said second stretch of said band extending from said third transverse edge being covered by said second portion of said ribbon;

a third gripper configured to be reversibly connected to a pair of coupling members, each of said coupling members comprising a base and a slot, said third gripper being configured to be reversibly connected to each of said coupling members at said base;

a third actuator connected to said third gripper and configured to move the third gripper such that, following:

a division, by said cutter, of said ribbon into said first and second portions, a division, by said cutter, of said band into said first and second stretches, and a connection of said third gripper to said pair of coupling members, said pair of coupling members is restable on said first portion of said ribbon at said bases and with said slots projecting past said second transverse edge of said band, said third actuator being configured to translate said third gripper so that said coupling members are restable on said first portion of said ribbon on opposite sides with respect to a longitudinal axis of symmetry of said band;

a second joining device configured to mutually connect each of the coupling members of said pair of coupling members and said first portion of said ribbon following the resting of said pair of coupling members on said first portion of said ribbon by said third actuator, so that said first stretch of said band, following a disconnection of:

said first gripper from said first stretch of said band, said second gripper from said ribbon, and said third gripper from said pair of coupling members, serves as a vertical strip includable in a sheer vertical blind, said first actuator, following a disconnection of said first gripper from said first stretch of said band, being configured to translate said first gripper into a position such that said first gripper are reversibly connectable to said second stretch of said band at said third transverse edge, said second actuator, following a disconnection of said second gripper from said ribbon, being configured to translate said second gripper into a position such that said second gripper are is reversibly connectable to an additional ribbon at least partly made of non-woven fabric, at an edge of said additional ribbon, said third actuator, following a disconnection of said third gripper from said pair of coupling members, being configured to move said third gripper into a position such that said third gripper are reversibly connectable to an additional pair of said coupling members at said bases of the coupling members, so that:

following a connection of said first gripper to said second stretch of said band, together with said second portion of said ribbon, said second stretch of said band is draggable, at said third transverse edge, on said support surface by said first actuator so that an additional portion of said band belonging to said second stretch thereof and not including said third transverse edge is placeable at said stretch of the path travelled by said second gripper at a translation thereof by said second actuator, following a connection of said second gripper to said additional ribbon at said edge of the additional ribbon, said additional ribbon is draggable, by said second actuator, and restable on said additional portion of said second stretch of said band so that said additional ribbon at least partly opposes said additional portion of said second stretch of said band transversely to said band, following a resting of said additional ribbon on said additional portion of said second stretch of said band, said additional ribbon and said additional portion of said second stretch of said band are mutually connectable by said first joining device, following a mutual connection between said additional ribbon and said additional portion of said second stretch of said band by said first joining device, said additional ribbon is dividable, by said cutter, into a first portion and a second portion, and said second stretch of said band, at said additional portion thereof, into:

a first sub-stretch extending from: said third transverse edge of said band toward a fifth transverse edge of said second stretch of said band, opposite to said third transverse edge, and formed following said cut made by said cutter in said second stretch of said band, an end section of said first sub-stretch of said second stretch of said band extending from said fifth transverse edge being covered by said first portion of said additional ribbon, and a second sub-stretch corresponding to the remaining part of said second stretch of said band and extending from: a sixth transverse edge of said second stretch of said band, opposing said fifth transverse edge, and formed following said cut made by said cutter in said second stretch of said band toward said fourth transverse edge of said band, an end section of said second sub-stretch of said second stretch of said band extending from said sixth transverse edge being covered by said second portion of said additional ribbon;

following:

a division, by said cutter, of said additional ribbon into said first and second portions, a division, by said cutter, of said second stretch of said band into said first and second sub-stretches, and a connection of said third gripper to said additional pair of coupling members, said additional pair of said coupling members is restable, by said third actuator, on said first portion of said additional ribbon at said bases, with said slots projecting past said fifth transverse edge of said first sub-stretch of said second stretch of said band, and with said coupling members of said additional pair on opposite sides with respect to said longitudinal axis of symmetry of said band, following a resting of said further pair of coupling members on said first portion of said additional ribbon, said additional pair of coupling members and said first portion of said additional ribbon are mutually connectable, so that said first sub-stretch of said second stretch of said band, following a disconnection of:

said first gripper from said first sub-stretch of said second stretch of said band, said second gripper from said additional ribbon, and said third gripper from said additional pair of coupling members, serves as an additional vertical strip includable in a sheer vertical blind.

2. The apparatus according to claim 1, further comprising an additional cutter configured to make a through-cut transversely in an additional band including said ribbon and said additional ribbon joined to each other at respective transverse edges, said additional cutter being configured to make a through-cut in said additional band so as to divide the latter additional band at least into said ribbon and said additional ribbon.

3. The apparatus according to claim 1, wherein said first joining device, said cutter, and said second joining device are disposed at respective stages of said apparatus, said first actuator:

following a mutual connection between said ribbon and said portion of said band by said first joining device, being configured to translate said first gripper over said support surface so that said cutter makes said cut in said ribbon and in said portion of said band, following a division, by said cutter, of said ribbon into said first and second portions and a division, by said cutter, of said band into said first and second stretches, being configured to translate said first gripper over said support surface so that said second joining device mutually connects each coupling member of said pair of coupling members and said first portion of said ribbon, following a mutual connection between said additional ribbon and said additional portion of said second stretch of said band by said first joining device, being configured to translate said first gripper over said support surface so that said cutter is configured to make said cut in said additional ribbon and in said additional portion of said second stretch of said band, following a division, by said cutter, of said additional ribbon into said first and second portions and a division, by said cutter, of said second stretch of said band into said first and second sub-stretches, being configured to translate said first gripper over said support surface so that said second joining device mutually connects each of the coupling members of said additional pair of coupling members and said first portion of said additional ribbon.

4. The apparatus according to claim 1, wherein said first joining device is configured to mutually connect said ribbon, said portion of said band, said additional ribbon, and said additional portion of said second stretch of said band, by textile heat sealing.

5. The apparatus according to claim 1, wherein said second joining device is configured to mutually connect each of the coupling members of said pair of coupling members, said first portion of said ribbon, each of the coupling members of said additional pair of coupling members, and said first portion of said additional ribbon, by ultrasonic sealing.

6. The apparatus according to claim 1, wherein said third gripper comprises a gas-operated device including a pair of suction mouths at each of which said gas-operated device is configured to create a negative pressure, said gas-operated device, at each of said suction mouths, being configured to create a negative pressure so that when a coupling member of said pair of coupling members or of said additional pair of coupling members is at said suction mouth, said coupling member is connected to said suction mouth, said gas-operated device being further configured to make said negative pressure fail, at each of said suction mouths and after said negative pressure is created at said suction mouth with the coupling member of said pair of coupling members or of said additional pair of coupling members at said suction mouth, to disconnect said coupling member from said suction mouth.

7. A method for making a plurality of vertical strips includable in a sheer vertical blind, said method being implementable by the apparatus according to claim 1, the method comprising:

a) preparing:

the support surface, the band at least partly made of flexible material, a first plurality of ribbons, each of which is at least partly made of non-woven fabric, a second plurality of pairs of coupling members, each of the coupling members of each pair of said second plurality comprising the base and a slot;

b) dragging said band on said support surface by the first transverse edge of said band;

c) dragging the ribbon of said first plurality on said band so that said ribbon is rested on the portion of said band not including said transverse edge of said band whereby the band was dragged in step b), said ribbon being dragged on said band so that said ribbon at least partly opposes said portion of said band not including said first transverse edge of said band whereby the band was dragged in step b), said ribbon being further dragged on said band so that said ribbon is rested on said band transversely to the band;

d) mutually connecting said ribbon-dragged in step c) and said portion of said band not including said first transverse edge of said band whereby the band was dragged in step b);

e) making the through-cut longitudinally in said ribbon dragged in step c) and simultaneously transversely in said band at said portion of the band not including said first transverse edge of said band whereby the band was dragged in step b), to divide said ribbon dragged in step c) into the first portion and the second portion, and said band, at said portion thereof not including said first transverse edge of said band whereby the band was dragged in step b), into:

the first stretch extending from: said first transverse edge of said band whereby the band was dragged toward the second transverse edge of said band, opposite to said first transverse edge of said band whereby the band was dragged in step b), and formed following said made cut, the end section of said first stretch of said band extending from said edge of said band, opposite to said first transverse edge of said band whereby the band was dragged in step b) being covered by said first portion of said ribbon, and the remaining part of said band extending from:

the third transverse edge of said band opposing said second transverse edge of said band, opposite to said first transverse edge of said band whereby the latter was dragged and formed following said made cut toward the fourth transverse edge of said band, opposite to said third transverse edge of said band opposing said second transverse edge of said band, opposite to said first transverse edge of said band whereby the band was dragged in step b), an end section of said remaining part of said band extending from said transverse edge of said band opposing said second transverse edge of said band, opposite to said first transverse edge of said band whereby the band was dragged in step b) being covered by said second portion of said ribbon;

f) resting one of the pairs of coupling members of said second plurality on said first portion of said ribbon at said bases and with said slots projecting past said second transverse edge of said band, opposite to said first transverse edge of said band whereby the band was dragged in step b), said coupling members of said one pair being rested on said first portion of said ribbon on opposite sides with respect to a longitudinal axis of symmetry of said band;

g) mutually connecting said first portion of said ribbon and each of the coupling members of said pair rested on said ribbon in step f), so that said stretch of said band serves as the vertical strip includable in the sheer vertical blind;

h) when there is a need to make another vertical strip includable in the sheer vertical blind, returning to step b):

dragging, on said support surface, said remaining part of said band obtained in step e), by said third transverse edge of said band opposing said second transverse edge of said band, opposite to said first transverse edge of said band whereby the band was dragged in step b), and formed following said cut made in step e), dragging, in step c), another ribbon of said first plurality of ribbons, and resting, in step f), another pair of coupling members of said second plurality of pairs of coupling members.

8. The method according to claim 7, wherein each of said coupling members of each pair of said second plurality of pairs of coupling members arranged in step a) comprises:

a first recess at said base, in step f), said first portion of said ribbon dragged in step c) being at least partly accommodated in said first recess when said coupling member is rested on said first portion of said ribbon dragged in step c), a second recess at a stretch of an edge of said slot, said stretch of said edge of said slot being opposite to said base of said coupling member, in each of said coupling members of each pair of said second plurality of pairs of coupling members, said first and second recesses facing mutually opposite sides.

* * * * *